United States Patent [19]
Collins, Jr. et al.

[11] Patent Number: 5,773,767
[45] Date of Patent: Jun. 30, 1998

[54] SCALE WITH RESET EXTENDER BAR

[75] Inventors: Donald A. Collins, Jr., Lawrenceville; Rex A. Aleshire, Buford, both of Ga.

[73] Assignee: NCR Corporation, Dayton, Ohio

[21] Appl. No.: 703,831

[22] Filed: Aug. 27, 1996

[51] Int. Cl.$^6$ ........................... G01G 21/28; G01G 21/00; G01G 19/56

[52] U.S. Cl. ........................... 177/126; 177/127; 177/148; 177/149; 177/124; 177/45

[58] Field of Search .................................... 177/131, 126, 177/127, 148, 149, 262, 45, 124

[56] References Cited

U.S. PATENT DOCUMENTS

| | | | |
|---|---|---|---|
| 4,441,568 | 4/1984 | Heffner | 177/129 |
| 4,619,337 | 10/1986 | Behrend et al. | 177/210 R |
| 4,700,656 | 10/1987 | Cone et al. | 177/245 |
| 4,719,980 | 1/1988 | Knothe et al. | 177/180 |
| 4,881,606 | 11/1989 | Halfon et al. | 177/126 |
| 4,971,176 | 11/1990 | Nojiri et al. | 186/61 |
| 5,010,968 | 4/1991 | Barrow | 177/118 |
| 5,139,100 | 8/1992 | Brauneis | 177/25.15 |
| 5,343,000 | 8/1994 | Griffen et al. | 177/145 |
| 5,410,108 | 4/1995 | Williams et al. | 177/25.15 |
| 5,496,972 | 3/1996 | Demar et al. | 177/126 |

OTHER PUBLICATIONS

Siemens Nixdorf, "WE 02 Scanner Scales," in public use more than 1 year, single page.

*Primary Examiner*—Michael L. Gellner
*Assistant Examiner*—Anh Mai
*Attorney, Agent, or Firm*—Francis L. Conte

[57] ABSTRACT

A weighing scale includes a housing having a top opening defined by a top flange. A weighing module is mounted inside the housing for measuring weight. A scale platform is disposed inside the top opening and rests atop the weighing module by gravity. A proximity sensor is mounted inside the housing adjacent to the platform for detecting proximity thereof, and is joined in communication with the weighing module. An elongate lift bar is pivotally mounted atop the platform for movement between a stowed position flush with the platform and a deployed position spaced in part upwardly above the platform for extending size of the platform and for permitting manual lifting of the platform away from the proximity sensor and return adjacent thereto for resetting the weighing module.

18 Claims, 3 Drawing Sheets

SCALE WITH RESET EXTENDER BAR

BACKGROUND OF THE INVENTION

The present invention relates generally to weighing scales, and, more specifically, to scales requiring periodic resetting.

Retail stores commonly use a combination laser scanner and weighing scale for reading bar codes, or weighing a retail product and electronically calculating the price thereof. The combined scanner/scale typically includes a scale platform suitably mounted in a stationary housing at a checkout counter. The housing includes different modules for weighing items placed atop the scale platform or for reading bar codes contained on the items by projecting a laser beam through a window mounted in the platform.

The platform is typically flush with the checkout counter for allowing unobstructed travel of a sequence of merchandise which are either slid or carried across the platform. The platform is typically mounted in its housing with a small perimeter gap therebetween for allowing unobstructed vertical movement of the scale platform while minimizing the likelihood of debris falling into the housing. However, over the course of time, debris nevertheless accumulates in the perimeter gap which eventually interferes with the free vertical movement of the scale platform which compromises the accuracy of weighing.

In this situation, the cashier or clerk manually removes the platform by lifting it vertically upwardly, and then removes accumulated debris which interferes with the free motion of the platform. The platform is then lowered and reseated into position in its housing.

In one conventional design, a manual reset button is then pressed by the clerk for allowing the weighing module to automatically recalibrate itself to zero the scale. In another embodiment, a suitable proximity sensor is contained inside the scale housing for detecting the proximity of the platform relative thereto. When the platform is removed and reseated, the proximity sensor detects this and the weighing module automatically recalibrates and zeros the scale when the proximity sensor detects return of the scale plate into position.

Since the top of the scale plate is flat, and the perimeter gap is relatively small, it is difficult to access the platform for the manual removal thereof. In order to allow the easy removal of the platform, one conventional design incorporates a small door-like lift handle pivotally mounted flush in a portion of the platform in a complementary access hole. The lift handle is easily pivoted upwardly into a deployed position allowing the user to grab the handle and lift the platform for removal or resetting the weighing module. However, the lift handle requires additional components for its introduction into the scale platform which increases the parts count and cost thereof, with the lift handle itself also being subject to the accumulation of debris during operation.

SUMMARY OF THE INVENTION

A weighing scale includes a housing having a top opening defined by a top flange. A weighing module is mounted inside the housing for measuring weight. A scale platform is disposed inside the top opening and rests atop the weighing module by gravity. A proximity sensor is mounted inside the housing adjacent to the platform for detecting proximity thereof, and is joined in communication with the weighing module. An elongate lift bar is pivotally mounted atop the platform for movement between a stowed position flush with the platform and a deployed position spaced in part upwardly above the platform for extending size of the platform and for permitting manual lifting of the platform away from the proximity sensor, and return adjacent thereto, for resetting the weighing module.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
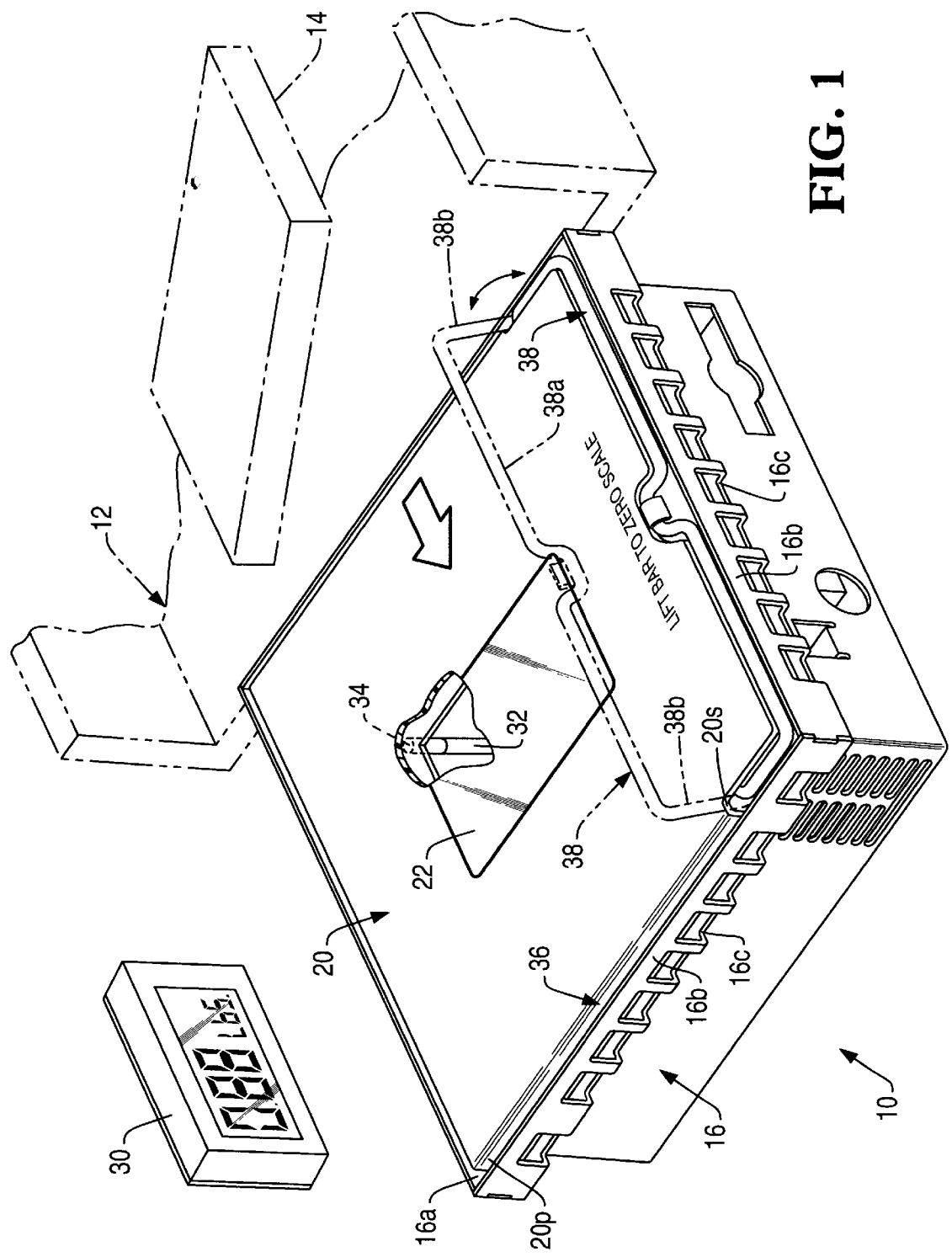
FIG. 1 is an isometric view of a combination scanner and weighing scale mounted in a portion of a checkout counter in accordance with an exemplary embodiment of the present invention.

Illustrated in FIG. 1 is a combination laser scanner and electronic weighing scale 10 in accordance with an exemplary embodiment of the present invention. The scale 10 is suitably mounted in a checkout counter 12 for use in reading bar codes or weighing retail products or merchandise 14. The scale 10 forms an integral part of a transaction terminal (not shown) including a cash register joined thereto for adding price of merchandise purchased in typical fashion.

Figure 2:
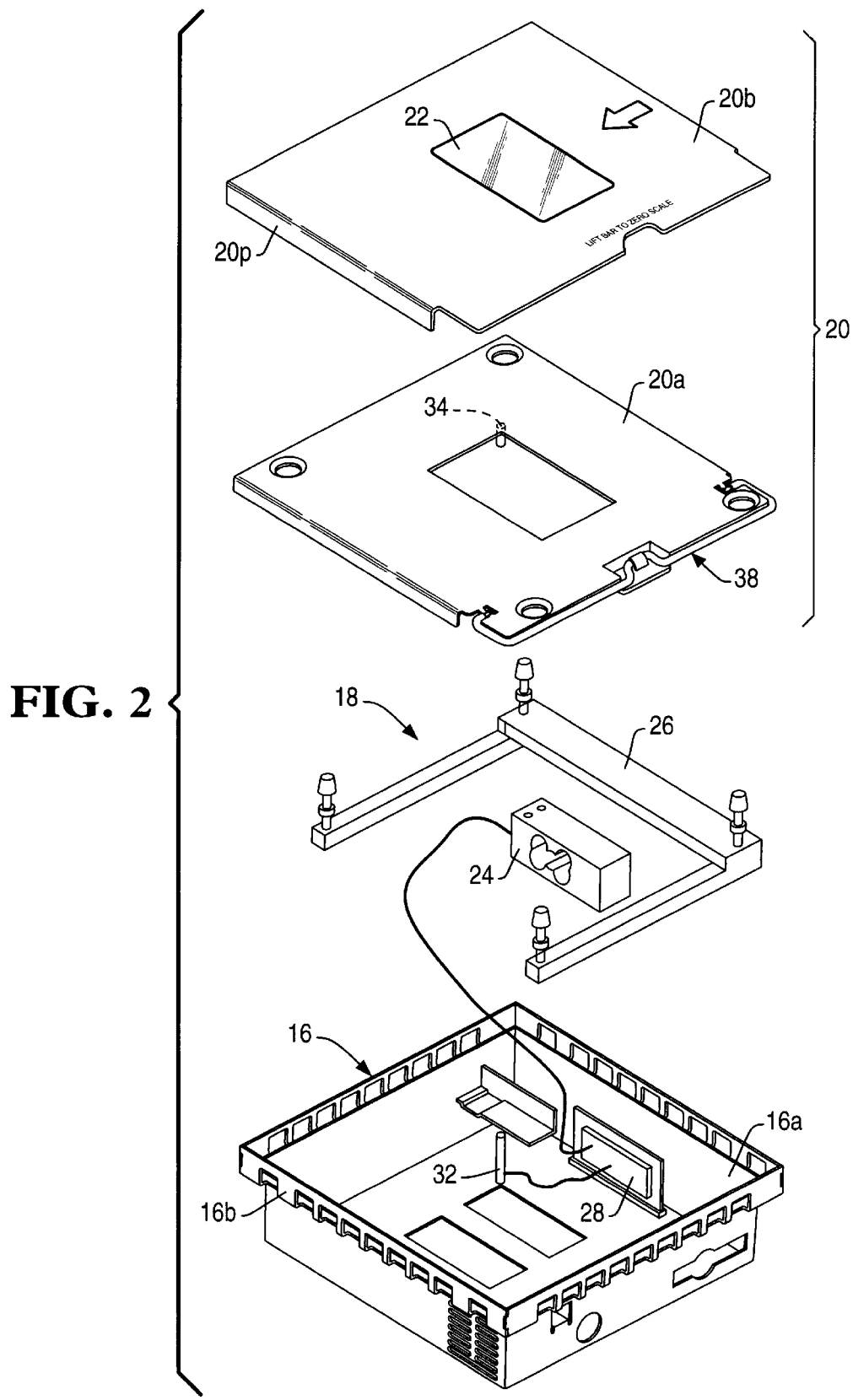
FIG. 2 is an exploded view of the weighing scale illustrated in FIG. 1 having a lift bar pivotally mounted in a scale platform in accordance with an exemplary embodiment of the present invention.

The scale 10 includes a bucket or housing 16 having a generally rectangular top opening 16a defined by a corresponding rectangular, vertically upwardly extending top flange 16b. As shown in FIG. 2, a conventional weighing module 18 is suitably mounted inside the housing 16 for electronically measuring weight. A substantially flat scale platform 20 is disposed inside the top opening 16a slightly higher than flush with the top flange 16b as illustrated in FIG. 1, and rests by gravity atop the weighing module 18.

As shown in FIGS. 1 and 2 the exemplary platform 20 may include a central window 22 through which a suitable laser beam is projected for reading bar codes in a conventional manner. Since the bar code scanner itself operates conventionally and independently of the weighing module 18, it is not further described in detail hereinbelow. The weighing scale 10 may be configured solely for weighing merchandise, or may be combined with conventional bar code scanners as desired.

Referring again to FIG. 2, the weighing module 18 may take any suitable form, and in the exemplary embodiment illustrated includes a conventional cantilever load cell 24 which is suitably fixedly mounted inside the housing 16, and supports on its distal end a suitable carriage 26. The carriage 26 has several vertically upwardly extending resting pins on which the scale platform 20 simply rests atop. The load cell 24 conventionally includes several strain gauges which are operatively joined to a suitable electronic control board or simply controller 28.

During operation, the scale platform 20 rests atop the carriage 26 which in turn rests atop the load cell 24, with the weight exerted atop the load cell 24 causing strain therein which is measured for determining weight electronically in the controller 28 in a conventional manner. The controller 28 is conventionally configured to reset or zero the scale when solely the scale platform 20 and carriage 26 rest atop the load cell 24. As shown in FIG. 1, a conventional electronic display 30 is suitably operatively joined to the controller 28 for displaying any desired information such as weight measured or product price. When the scale 10 is initially reset, the display 30 will display zero weight.

As shown in FIGS. 1 and 2, the exemplary scale 10 also includes a conventional proximity switch or sensor 32 suitably fixedly mounted inside the housing 16 adjacent to the platform 20 for detecting proximity of the platform 20 adjacent thereto. The proximity sensor 32 may be in the exemplary form of a magnetic Hall sensor used in combination with a suitable magnet 34 suitably fixedly mounted to the underside of the platform 20. As shown in FIG. 1, the platform 20 in normal operation is allowed free vertical travel when weighing merchandise, and the magnet 34 is suitably spaced above the proximity sensor 32 to prevent contacting interference therewith. However, the proximity sensor 32 detects the magnetic presence of the magnet 34 and is joined in communication with the controller 28 for indicating the presence of the platform 20 in position.

As shown in FIG. 1, the platform 20 includes a rectangular perimeter 20p extending along the top flange 16b and spaced laterally inwardly therefrom to define a suitably small clearance or perimeter gap 36 therebetween for allowing unobstructed vertical movement of the platform 20 relative to the housing 16 for obtaining accurate weighing of merchandise placed atop the platform 20. The perimeter gap 36 is provided on all four sides of the platform 20 and is made relatively small to limit the ingress therein of debris during operation.

As indicated above, the housing 16 is suitably mounted in the checkout counter 12 and is therefore subject to the passage thereover of a substantial volume of merchandise over time. The perimeter gap 36 is typically sized sufficiently small to trap thin credit cards which may accidentally drop or slide across the platform 20. Small debris, however, will eventually fall in the perimeter gap 36, and the housing 16 therefore also includes a plurality of cleanout holes 16c spaced laterally apart around the perimeter of the top flange 16b so that small debris may simply fall below and not inside the housing 16.

Nevertheless, small debris accumulates over time in the perimeter gap 36 and eventually interferes with the free vertical movement of the platform 20. Since the weighing module 18 necessarily weighs the scale platform 20 itself when unloaded, it therefore is also able to detect that the scale platform 20 is abnormally heavy by interference of debris in the perimeter gap 36 with the platform 20 which causes the platform 20 to stick downwardly, or which causes the platform to stick upwardly indicating an abnormally light platform 20. When the weighing module 18 detects that the platform 20 is out of its weight specification, the display 30 becomes blank indicating that the scale 20 is no longer accurate. A clerk then removes the plate 20 and cleans any accumulated debris around the perimeter gap 36 and returns the platform 20 into position atop the carriage 26. In this embodiment, the proximity sensor 32 detects the absence of the platform 20 when it is removed, and then in turn it detects the presence of the platform 20 when it is reseated, with the controller 28 then automatically resetting the scale 10 to its zero value.

As indicated above in the background section, the perimeter gap 36 is relatively small and is not large enough for allowing the insertion of fingers therein for removing the platform 20 when required. In the prior art, a suitable hinged lift handle is mounted in a small portion of the top of the platform for being lifted when desired. However, the conventional lift handle is dedicated solely to that purpose and adds to the part count and cost of the scale, and is itself subject to accumulation of debris in the center region of the housing.

In accordance with the present invention, an elongate lift bar 38 as shown in FIGS. 1 and 2 is pivotally mounted atop the platform 20 for manual movement between a stowed position shown in solid line in FIG. 1 and in solid line in FIG. 2 substantially flush with the top surface of the platform 20, and in a deployed position shown in phantom line in FIG. 1 spaced in part upwardly above the platform 20. In the deployed position, the lift bar 38 is effective for extending the size of the platform 20 and for permitting manual lifting of the platform 20 vertically away from the proximity switch 32 and return adjacent thereto for automatically resetting the weighing module 18.

The lift bar 38 is in the preferred form of a specifically configured circular rod which extends across the platform 20, and in its upright deployed position allows relatively large merchandise 14 such as that illustrated in FIG. 1 to rest in part atop the platform 20 itself, and in part across the lift bar 38 to ensure that oversize merchandise 14 does not contact the housing top flange 16b or the checkout counter 12 which could cause erroneous weight readings. When the lift bar 38 is stowed flush with the top surface of the platform 20, merchandise may be simply slid across the platform 20 in the lateral direction illustrated in FIG. 1, and temporarily rest atop the platform 20 for the weighing thereof.

The lift bar 38 therefore not only provides an effective extension of the platform 20, but it is also now available for use as a reset handle and therefore eliminates the need for the conventional lift handle specifically configured for such use in a small portion of the platform 20.

When cleaning and resetting of the scale 10 is desired, the lift bar 38 may be manually lifted from its stowed position illustrated in FIG. 2 to its deployed position illustrated in FIG. 1. The lift bar 38 may then be manually lifted to, in turn, lift the platform 20 vertically upwardly away from the housing 16 and the proximity sensor 32 so that a clerk may then clean away debris around the housing top flange 16b. The lift bar 38 may then be used for lowering together the lift bar itself and the platform 20 to reseat the platform 20 atop the carriage 26 of the weighing module 18, and adjacent to the proximity sensor 32 for allowing automatic resetting of the weighing module 18.

As described above, the proximity sensor 32 detects the removal of the platform 20 and then detects the reseating of the platform and automatically resets the weighing module 18 for zeroing the scale in a conventional manner. The lift bar 38 as shown in its deployed position in FIG. 1 may then be returned to its stowed position as shown in FIG. 2 until it is needed for either extending the size of the platform 20 or for again removing the platform 20 for cleaning and resetting the scale 10.

The lift bar 38 is illustrated in more particularity in FIG. 2 in accordance with a preferred embodiment of the invention. The lift bar 38 is preferably disposed substantially flush with the top of the platform 20 along a suitable portion of the perimeter 20p in the perimeter gap 36 when in the stowed position as illustrated. In its deployed position as illustrated in FIG. 1, the lift bar 38 extends vertically upwardly and substantially perpendicularly from the platform 20.

Figure 3:
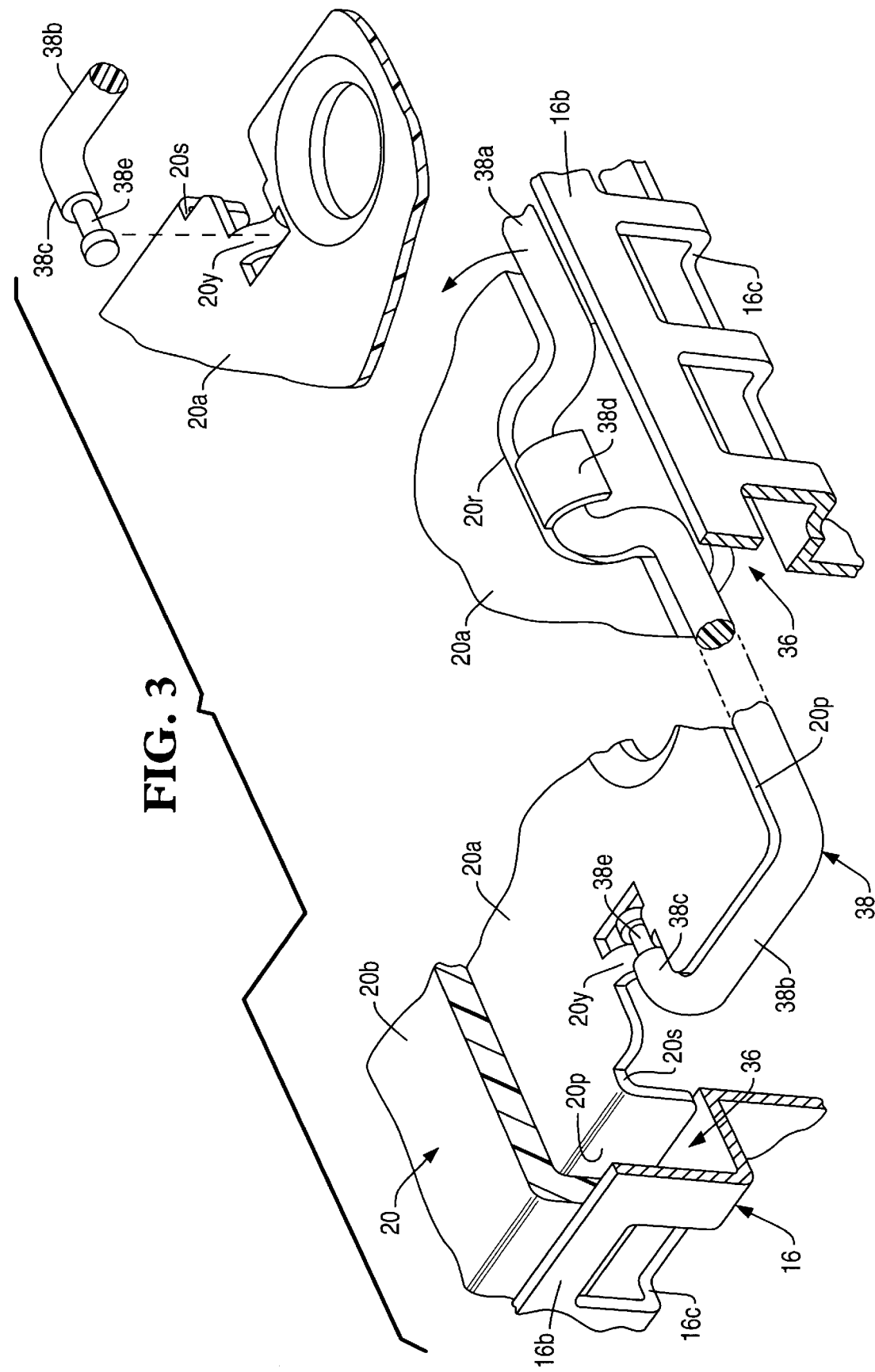
FIG. 3 is an enlarged, isometric view of a portion of the scale platform and lift bar illustrated in FIG. 1 mounted in the housing in accordance with an exemplary embodiment of the present invention.

In the preferred embodiment illustrated in FIGS. 1 and 3, the lift bar 38 includes an elongate crossbar 38a extending laterally across the platform 20 between opposite lateral sides thereof. A pair of straight and parallel relatively short integral links 38b extend perpendicularly from respectively opposite ends of the cross bar 38a to define a generally U-shaped lift bar 38. Each of the links 38b as illustrated in more particularity in FIG. 3 has a distal end defining an integral pin 38c pivotally joined to the platform 20 for allowing rotation of the lift bar 28 between its stowed and deployed positions.

As shown in FIG. 3, the lift bar 38 is preferably recessed along a respective portion of the platform perimeter 20p in the stowed position for maintaining the perimeter gap 36 substantially uniform in size, with the lift bar 38 remaining substantially flush with the top surface of the platform 20. The cross bar 38a preferably extends entirely along one side of the platform 20, and the links 38b extend along respective opposite sides of the platform 20 in the stowed position. Since the cross bar 38 is effectively hidden along a portion of the perimeter gap 36 next to the small perimeter gap 36, it is desirable to provide a convenient manner for lifting the lift bar 38 itself.

Accordingly, the cross bar 38a as shown in FIG. 3 preferably includes a finger pull 38d in the form of a central indentation extending away from the housing top flange 16b, and is disposed in a complementary recess 20r in the platform 20 when in the stowed position. The size of the finger pull 38d and corresponding platform recess 20r is suitably large for allowing a single finger to fit between the pull 38d and the top flange 16b for lifting the pull 38d and in turn the entire lift bar 38 when desired.

Since the lift bar 38 is preferably disposed in most part along the perimeter gap 36, it must be suitably restrained to prevent interference with the housing top flange 16b which could adversely affect the weighing function. Accordingly, each of the pins 38c preferably includes an annular groove 38e. And, the platform 20 preferably includes a pair of complementary U-shaped yokes 20y, with each yoke 20y receiving a respective one of the pins 38c at the grooves 38e for allowing pivoting therein.

In the preferred embodiment illustrated in FIGS. 2 and 3, the platform 20 preferably includes a rectangular bottom plate 20a containing the yokes 20y integrally formed therein at opposite sides thereof. The magnet 34 as illustrated in FIG. 2 is suitably fixedly joined to the underside of the bottom plate 20a. The platform 20 also includes a top plate 20b removably fixedly joined to the bottom plate 20a by any suitable means such as fasteners or snap fits for pivotally trapping the pins 38c in the respective yokes 20y. The axial ends of the pin grooves 38e restrain travel along the axes thereof and thereby restrain lateral movement of the entire lift bar 38 to prevent its inadvertent interference with the top flange 16b.

As shown in FIGS. 1 and 3, the platform 20 preferably also includes a suitable stop or step 20s adjacent to the respective pins 38c which is disposed at a higher elevation than the pins 38c themselves. The stops 20s are suitably spaced from the links 38b so that when the lift bar 38 is pivoted vertically into its deployed position as shown in phantom in FIG. 1, the respective links 38b contact the stops 20s which limits their pivoting travel. The pivoting travel of the links 38b is preferably slightly greater than 90° so that the lift bar 38 may be maintained by simple gravity in its deployed position upon resting against the respective stops 20s.

The lift bar 38 incorporated into the scale 10 described above provides the dual function of both effectively increasing the size of the scale platform 20 for supporting merchandise larger than the actual area of the platform 20, while also providing a convenient member for lifting the platform 20 to zero the scale 10. The lift bar 38 is self supporting in its deployed position and supports long items so that they do not come in contact mechanically with anything in the immediate environment. The lift bar 38 is conveniently integrated around a portion of the perimeter of the scale platform 20 at the perimeter gap 36 and neither interferes with performance of the platform 20 itself or with the adjacent housing top flange 16b. Like the remainder of the perimeter gap 36, any debris falling past the lift bar 38 itself also enters the perimeter gap 36 for automatic removal through the debris holes 16c.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A weighing scale comprising:

a housing having a top opening defined by a vertically extending top flange;

weighing means mounted inside said housing for measuring weight;

a scale platform disposed inside said top opening and resting by gravity atop said weighing means;

a proximity sensor mounted inside said housing adjacent to said platform for detecting proximity of said platform adjacent thereto, and operatively joined to said weighing means; and an elongate lift bar pivotally mounted atop said platform for movement between a stowed position in said platform and an upright deployed position for extending size of said platform and for permitting manual lifting of said platform away from said proximity switch and return adjacent thereto for resetting said weighing means.

2. A method of operating said scale of claim 1 comprising:

pivoting said lift bar from said stowed to deployed positions;

lifting said lift bar to lift said platform upwardly away from said proximity sensor; and lowering together said lift bar and platform to reseat said platform adjacent to said proximity sensor for resetting said weighing means.

3. A scale according to claim 1 wherein:

said platform includes a perimeter extending along said top flange and spaced laterally inwardly therefrom to define a perimeter gap therebetween for allowing unobstructed vertical movement of said platform; and said lift bar is disposed along a portion of said perimeter in said perimeter gap when in said stowed position, and extends vertically upwardly from said platform when in said deployed position.

4. A scale according to claim 3 wherein said lift bar comprises:

an elongate cross bar extending laterally across said platform from opposite sides thereof;

a pair of links extending perpendicularly from respective opposite ends of said cross bar to define a generally U-shaped lift bar; and each of said links has a distal end defining an integral pin pivotally joined to said platform.

5. A scale according to claim 4 wherein said lift bar is recessed along a respective portion of said platform perimeter in said stowed position for maintaining said perimeter gap substantially uniform.

6. A method of operating said scale of claim 5 comprising:

pivoting said lift bar from said stowed to deployed positions;

lifting said lift bar to lift said platform upwardly away from said proximity sensor; and lowering together said lift bar and platform to reseat said platform adjacent to said proximity sensor for resetting said weighing means.

7. A scale according to claim 5 wherein said cross bar extends along one side of said platform, and said links extend along respective opposite sides of said platform in said stowed position.

8. A scale according to claim 7 wherein said cross bar includes a finger pull in the form of a central indentation extending away from said top flange and disposed in a complementary recess in said platform when in said stowed position for increasing access space adjacent thereto.

9. A scale according to claim 8 wherein:

each of said pins includes an annular groove; and said platform includes a pair of complementary yokes, each receiving a respective one of said pins for allowing pivoting therein.

10. A scale according to claim 9 wherein said scale platform comprises:

a bottom plate containing said yokes at opposite sides thereof; and a top plate removably fixedly joined to said bottom plate for pivotally trapping said pins in said yokes.

11. A method of operating said scale of claim 10 comprising:

pivoting said lift bar from said stowed to deployed positions using said finger pull;

lifting said lift bar to lift said platform upwardly away from said proximity sensor; and lowering together said lift bar and platform to reseat said platform adjacent to said proximity sensor for resetting said weighing means.

12. A scale according to claim 1 wherein said lift bar comprises:

an elongate cross bar extending laterally across said platform from opposite sides thereof;

a pair of links extending perpendicularly from respective opposite ends of said cross bar to define a generally U-shaped lift bar; and each of said links has a distal end defining an integral pin pivotally joined to said platform.

13. A scale according to claim 12 wherein said lift bar is recessed along a respective portion of said platform perimeter in said stowed position for maintaining said perimeter gap substantially uniform.

14. A scale according to claim 13 wherein said cross bar extends along one side of said platform, and said links extend along respective opposite sides of said platform in said stowed position.

15. A scale according to claim 1 wherein:

said lift bar is generally U-shaped with two opposite end links; and said scale platform comprises a bottom plate, and a top plate removably fixedly joined to said bottom plate for pivotally trapping said links therein.

16. A scale according to claim 1 wherein said lift bar is disposed substantially flush with said platform in said stowed position.

17. A scale according to claim 16 wherein said platform includes a perimeter, and said lift bar is disposed substantially flush with said platform along a portion of said perimeter in said stowed position.

18. A scale according to claim 1 wherein said weighing means comprise:

a load cell fixedly mounted in said housing;

a carriage positioned atop said load cell, with said platform disposed atop said carriage; and a controller operatively joined to said load cell and said proximity sensor.

* * * * *